United States Patent
Schmitz et al.

(10) Patent No.: US 11,090,851 B2
(45) Date of Patent: Aug. 17, 2021

(54) METHOD AND MEASUREMENT DEVICE FOR MONITORING STRETCHABILITY IN THE PRODUCTION OF STRETCH FILMS IN A CAST FILM METHOD

(71) Applicant: Windmöller & Hölscher KG, Lengerich (DE)

(72) Inventors: Torsten Schmitz, Greven (DE); David Finnemore, Elvaston (GB); Daniel Faustmann, Georgsmarienhütte (DE); Waldemar Colell, Lienen (DE); Bernd-Alexander Gröpper, Drensteinfurt (DE)

(73) Assignee: Windmöller & Hölscher KG, Lengerich (DE)

( * ) Notice: Subject to any disclaimer, the term of this patent is extended or adjusted under 35 U.S.C. 154(b) by 345 days.

(21) Appl. No.: 15/536,995

(22) PCT Filed: Dec. 11, 2015

(86) PCT No.: PCT/EP2015/079397
§ 371 (c)(1),
(2) Date: Jun. 16, 2017

(87) PCT Pub. No.: WO2016/096648
PCT Pub. Date: Jun. 23, 2016

(65) Prior Publication Data
US 2017/0355122 A1 Dec. 14, 2017

(30) Foreign Application Priority Data
Dec. 19, 2014 (DE) .................. 10 2014 119 206.0

(51) Int. Cl.
*B29C 48/08* (2019.01)
*B29C 48/92* (2019.01)
(Continued)

(52) U.S. Cl.
CPC .............. *B29C 48/08* (2019.02); *B29C 48/92* (2019.02); *B29C 48/0018* (2019.02);
(Continued)

(58) Field of Classification Search
CPC ....... B29C 48/08; B29C 48/92; B29C 48/305; B29C 48/914; B29C 48/30;
(Continued)

(56) References Cited

U.S. PATENT DOCUMENTS

| 3,154,608 | A | | 10/1964 | Aronsen |
| 3,374,303 | A | * | 3/1968 | Metz, Jr. .............. B29C 33/044 |
| | | | | 264/216 |

(Continued)

FOREIGN PATENT DOCUMENTS

| DE | 15 04 084 | 7/1969 |
| DE | 41 18 122 | 12/1992 |

(Continued)

OTHER PUBLICATIONS

German Office Action dated Aug. 13, 2015, from German Patent Application No. 10 2014 119 206.0 along with an English translation.

(Continued)

*Primary Examiner* — Jacob T Minskey
*Assistant Examiner* — S. Behrooz Ghorishi
(74) *Attorney, Agent, or Firm* — DLA Piper LLP (US)

(57) ABSTRACT

A method of monitoring stretchability of stretch films in a cast film method includes determining a position of a frost line of a film material, which is solidifying to form a film web, on a casting roller of a film machine, ascertaining a correlation of the determined position of the frost line with at least one target position, and comparing the ascertained
(Continued)

correlation to at least one stretchability of the film material, which is assigned to the at least one target position.

13 Claims, 5 Drawing Sheets

(51) Int. Cl.
  *B29C 48/305* (2019.01)
  *B29C 48/88* (2019.01)
  *B29L 7/00* (2006.01)
  *B29C 48/00* (2019.01)
(52) U.S. Cl.
  CPC ......... *B29C 48/305* (2019.02); *B29C 48/914* (2019.02); *B29C 2948/92076* (2019.02); *B29C 2948/92219* (2019.02); *B29C 2948/92428* (2019.02); *B29C 2948/92571* (2019.02); *B29C 2948/92923* (2019.02); *B29C 2948/92942* (2019.02); *B29L 2007/00* (2013.01)
(58) Field of Classification Search
  CPC ............ B29C 48/0018; B29C 48/9155; B29C 48/274; B29C 2948/92219; B29C 2948/92571; B29C 2948/92923; B29C 2948/92076; B29C 2948/92942; B29C 2948/92428; B29C 47/8845; B29C 47/886; B29C 47/0021; B29C 47/92; B29C 43/222; B29C 33/044; B29C 2947/92076; B29C 2947/92171; B29C 2947/9218; B29C 2947/92714; B29L 2007/00
  See application file for complete search history.

(56) References Cited

U.S. PATENT DOCUMENTS

| | | | |
|---|---|---|---|
| 4,101,614 A * | 7/1978 | Havens | B29C 48/92 264/40.6 |
| 4,335,613 A * | 6/1982 | Luukkala | G01N 29/11 340/582 |
| 5,258,148 A | 11/1993 | Sensen et al. | |
| 5,295,805 A | 3/1994 | Akamatsu et al. | |
| 2006/0051540 A1 * | 3/2006 | Kagawa | B29C 55/28 428/35.7 |

FOREIGN PATENT DOCUMENTS

| | | |
|---|---|---|
| DE | 693 14 404 T2 | 4/1998 |
| EP | 0 522 278 A1 | 1/1993 |
| EP | 1 616 687 A1 | 1/2006 |
| GB | 2 019 045 A | 10/1979 |
| JP | 05-138733 A | 6/1993 |
| WO | 2014/143929 A2 | 9/2014 |

OTHER PUBLICATIONS

Written Opinion dated Mar. 17, 2016, from International Application No. PCT/EP2015/079397 along with a partial English translation.

Written Opinion dated Nov. 9, 2016, from International Application No. PCT/EP2015/079397along with a partial English translation.

Office Action dated Dec. 12, 2019, from counterpart European Patent Application No. 15 813 313.2, along with a Summary in English.

* cited by examiner

METHOD AND MEASUREMENT DEVICE FOR MONITORING STRETCHABILITY IN THE PRODUCTION OF STRETCH FILMS IN A CAST FILM METHOD

TECHNICAL FIELD

The present invention relates to a method for monitoring the stretchability in the production of stretch films in a cast film method, a measuring device for carrying out such a method, and a film machine having such a measuring device.

BACKGROUND

It is fundamentally known that stretch films are produced in cast film methods. In this case, the flowing film material is typically arranged on a casting roller through an oblong discharge gap via a discharge device. Such a casting roller is typically cooled, so that the film material is cooled during the rotation of the casting roller in the course of its rotation. During the cooling, the film material passes through a temperature profile and falls below its own solidification temperature at a certain point in time, so that it begins to solidify. At the removal point for the film material on the casting roller, the film material must be completely solidified to form a film web.

The stretchability of a stretch film is a main quality feature. A defined stretchability is thus necessary to be able to ensure a desired stretch packaging on a pallet with sufficient security. In the case of a stretch film, it is frequently wrapped by means of robot technology around a pallet and the products arranged thereon and strongly deformed at the same time. The stretching range has the result that restoring forces arise in the material of the stretch film due to the elastic deformation, which act as retaining forces on the product on the pallet and therefore achieve the desired stabilization. It is therefore necessary for a minimum amount of stretchability to be able to be defined and specified and also guaranteed in a stretch film, to avoid undesired film tears during the winding method. A laboratory test is typically required for this purpose, which is carried out during the startup of the machine and typically also at defined intervals, for example, every four hours, in running operation. In this case, a sample of the produced stretch film is taken and a corresponding stress-strain diagram is subsequently determined in the laboratory. The setting phase for the production of the stretch film and the quality assurance are thus ensured. The respective sample taking and the complex setting procedure result in a reduced overall quality of the stretch film, a high level of expenditure with respect to the sample taking and the entire setting procedure, and not least in a high level of discard material or a large quantity of so-called B product.

It is the object of the present invention to at least partially remedy the above-described disadvantages. In particular, it is the object of the present invention to improve the quality of the stretch film, in particular to reduce discards, in a cost-effective and simple manner. Further features and details result from the Applicant's claims, the description, and the drawings. Features and details described in conjunction with the method also apply in conjunction with the measuring device and the film machine and vice versa in each case, of course, so that reference is always reciprocally made or can be made with respect to the disclosure of the individual aspects of the invention.

SUMMARY

We provide a method of monitoring stretchability of stretch films in a cast film method including determining a position of a frost line of a film material, which is solidifying to form a film web, on a casting roller of a film machine, ascertaining a correlation of the determined position of the frost line with at least one target position, and comparing the ascertained correlation to at least one stretchability of the film material, which is assigned to the at least one target position.

We also provide a measuring device that monitors stretchability of stretch films in a cast film method including a sensor device for a determination of the position of a frost line of a film material, which is solidifying to form a film web, on a casting roller of a film machine, and a monitoring unit that ascertains the correlation of the determined position of the frost line with at least one target position and comparing the ascertained correlation to a stretchability of the film material assigned to the at least one target position.

We further provide a film machine that produces stretch films by casting including a discharge device having a discharge gap for the discharge of free-flowing film material and a rotatably mounted casting roller that receives discharged free-flowing film material on a surface of the casting roller; a measuring device that monitors stretchability of stretch films in a cast film method including a sensor device for a determination of the position of a frost line of a film material, which is solidifying to form a film web, on a casting roller of a film machine; a monitoring unit that ascertains the correlation of the determined position of the frost line with at least one target position and comparing the ascertained correlation to a stretchability of the film material assigned to the at least one target position; and a cleaning device having a rotatably mounted cleaning roller that contacts the film material arranged on the surface of the casting roller.

Figure 1:
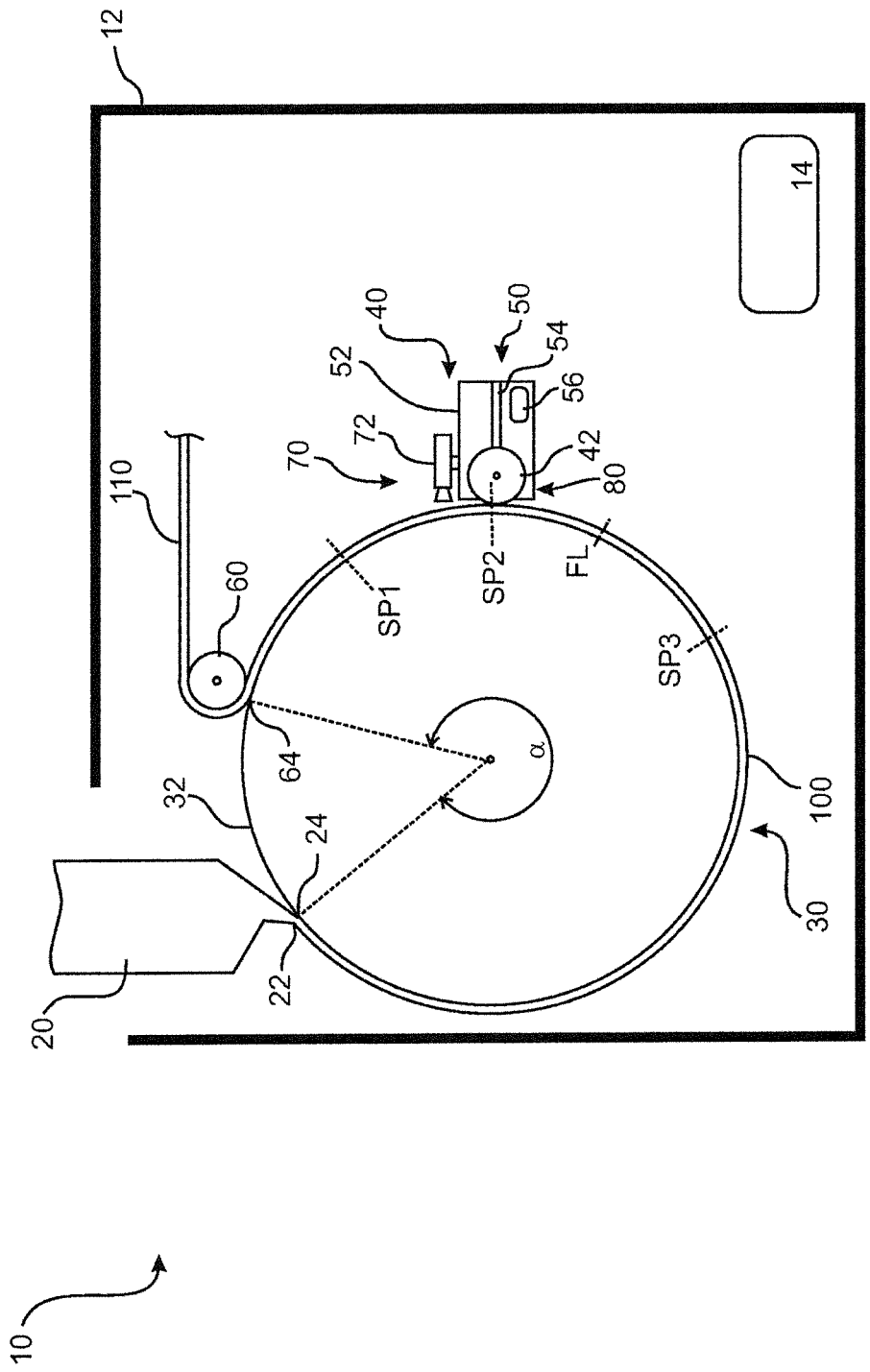
FIG. 1 schematically shows an embodiment of a film machine according to the invention, FIG. 2 schematically shows the embodiment of FIG. 1 with changed position of a cleaning device, FIG. 3 schematically shows a possibility of the correlation of a stretchability, FIG. 4 schematically shows a further embodiment of a correlation of a stretchability, and FIG. 5 schematically shows an option of targeted regulation.

LIST OF REFERENCE NUMERALS 10 film machine
12 framework
14 monitoring unit
20 discharge device
22 discharge gap
24 receiving location
30 casting roller
32 surface
40 cleaning device
42 cleaning roller
50 adjustment mechanism
52 circumferential adjustment
54 radial adjustment
56 sensor device
60 tear-off roller
64 lift-off location
70 measuring device
72 sensor device 80 marking device
100 film material
110 film web
α wraparound angle
KO correlation
SP target position
FL frost line

DETAILED DESCRIPTION

A method according to the invention is used for monitoring the stretchability in the production of stretch films in a cast film method. For this purpose, the method according to the invention comprises the following steps:
  determining the position of the frost line of a film material, which is solidifying to form a film web, on a casting roller of a film machine,
  ascertaining the correlation of the determined position of the frost line with at least one target position,
  comparing the ascertained correlation to a stretchability of the film material assigned to the at least one target position.

In a method according to the invention, a possibility occurs of the assignment of the stretchability and therefore the monitoring of the stretchability of the stretch film within the production method. This can also be referred to as so-called in-line determination or in-line measurement. It has surprisingly been established in this case that a correlation exists between the stretchability of the film material of the stretch film and the position of the frost line on the casting roller.

A frost line in the meaning of the present invention is to be understood as the section on the casting roller or in the film material on the casting roller in which the solidification procedure takes place. Thus, from a certain melting temperature, which is in particular in the vicinity of the solidification temperature of the film material, the crystalline structure of the film material changes and the entire film material hardens and therefore solidifies. Subsequently, i.e., in the further course of the contact length of the film material on the casting roller, the film web is solidified and is no longer free-flowing, but rather is in a solid state. This transition region is referred to as the frost line. In this case, the frost line can have an axial extension along a straight line on the surface of the casting roller, which extends in particular in parallel to the axis of rotation of the casting roller. In this case, both a linear extension and also a section-width extension of the frost line are conceivable in the meaning of the present invention.

The frost line can, as explained in greater detail hereafter, be established in greatly varying ways. Temperature measurement, ultrasonic monitoring, or the like are mentioned here by way of example. Therefore, after the determination of the frost line, according to the invention, a correlation is possible with at least one target position. The target position can already include a quality criterion in this case or the target position can be based on a quality criterion. It has thus fundamentally been recognized that the duration of the cooling is related to the stretchability of the stretch film. A decisive factor for a high stretchability is thus slow cooling, in particular from a high melting temperature of the film material. The slower cooling takes place, the longer the path which the free-flowing film material also covers on the surface of the casting roller jointly therewith due to the rotation of the casting roller. The entire wraparound of the casting roller by the film material is also referred to as the contact length. The farther to the rear the frost line is thus located in the contact length, the longer the path which the film material has covered in the still free-flowing state. Depending on the rotational velocity, but in particular in the event of equal rotational velocity, a frost line shifted to the rear is therefore correlated with a longer cooling time and in this manner also with a slower cooling rate.

According to the invention, at least one target position is now specified, wherein the correlation with the determined position of the frost line is to be understood in particular in a qualitative or quantitative manner. It can thus be fundamentally sufficient if the correlation contains information about whether the frost line is located before or after the target position along the contact length. Because a longer contact length can be assigned to a higher stretchability, accordingly the target position as at least one quality feature is a measure of whether the stretchability assigned to this target position is achieved or not. If the frost line is thus located behind the target position in relation to the contact line, the quality criterion is met. In contrast thereto, if the frost line is located before the target position in relation to the contact length, the target criterion or this quality feature of the minimum stretchability is thus not achieved.

Of course, significantly more complex regulating mechanisms are also possible using a method according to the invention. Thus, two or more target positions are also conceivable, so that the correlation with these two or more target positions includes a plurality of correlations. The stretchability can thus be assignable still more finely in a qualitative or even quantitative manner. In an ideal regulating case, an arbitrary number of target positions is specified, which are available in particular as a functional relationship or as a regulation graph. A high number of target positions can also be specified as a characteristic curve, which is defined either solely as a characteristic curve or by interpolation of support points as an ascertained characteristic curve. In all of these cases, the correlation includes a corresponding distance from the closest target position or, upon the provision of a functional relationship, directly includes the assignable stretchability of the exactly met target position by way of the corresponding functional relationship.

It is now possible by way of a method according to the invention to monitor the startup procedure of the machine in-line and in particular continuously. In this case, the control loop described in greater detail hereafter is preferably used, so that the comparison of the ascertained correlation to the assigned stretchability results in a targeted change of regulating parameters of the film machine. In this manner, in-line monitoring of the quality criterion is also possible, which also enables a readjustment or modulation in a manner according to the invention. Not only are the effort and the time for the quality monitoring and the startup procedure of the machine reduced by the preceding steps, but rather also the discard material of reduced quality, which is required for this purpose, is significantly decreased.

A maximum stretchability of the stretch film is preferably in a range between approximately 50% and approximately 500% in this case. Ranges between approximately 200% and approximately 500% are preferred, wherein the range is particularly preferably between approximately 300% and approximately 500%. Among the regulating parameters described in greater detail hereafter, which can be influenced by a method according to the invention, the temperature of the casting roller, a partial vacuum in the vacuum box of the film machine, the melt fan length, or the melting temperature are to be mentioned in particular.

It can be advantageous if, in a method according to the invention, the determination of the frost line is at least partially carried out by means of ultrasound. This is particularly advantageous with respect to a contactless determination option. Thus, a corresponding inference about the frost line can be drawn from transmission, adsorption, and/or reflection of the ultrasonic radiation. This contactless and rapid determination in particular detects forming crystalline structures in the solidification procedure of the film material in this case. Of course, this determination of the frost line is freely combinable with the determination options explained hereafter, for example, to be able to achieve a higher speed or a higher accuracy of the determination of the frost line.

It can also be advantageous if, in a method according to the invention, the determination of the frost line is at least partially carried out by a marking device, in particular a marking roller, wherein geometrical markings are introduced into the solidifying film material. Thus, for example, a mechanical influence on the film material can be performed by a marking roller, which can also be provided by a cleaning roller to be described in greater detail hereafter. If the film material is still in a free-flowing state, if it is thus still located before the frost line, this mechanical application of geometrical markings to the film material is thus omitted. In this position of the marking device, the film material is thus still free-flowing and is located before the frost line. However, if the marking device no longer leaves behind visible markings, it is thus to be inferred that the film material is already sufficiently cooled at this position of the marking device. This position is thus located after the frost line. Using this method, finding the frost line can be performed in an iterative manner. In this case, the combination with a camera is preferably provided, which is capable of perceiving the geometric markings in an operator-assisted or even fully automatic manner. In particular for an iteration option, such a marking device is arranged movably in the circumferential direction of the casting roller.

It is also advantageous if, in a method according to the invention, the determination of the frost line is performed at least partially by means of temperature determination of the film material, in particular in comparison to a solidification temperature of the film material. A differentiation is fundamentally to be made in this case between a solidification temperature, i.e., the temperature at which the phase transition occurs between solid and liquid for the film material, and a melting temperature, which is above the solidification temperature, and which represents the temperature of the free-flowing or liquid film material. The temperature determination can also be performed in a contacting or contactless manner, for example, with the aid of infrared measurement. In particular, particularly accurate and direct determination of the frost line can be performed here, without a regulating-technology interpretation of other sensor data having to be performed. Rather, the comparison and therefore the correlation between determined temperature and solidification temperature of the film material is sufficient to obtain information about where the frost line is located or how far away the present measuring position is still located from the frost line. A first statement about the stretchability of the film web for the film material is also already to be made by the determination of a temperature on a circumferential point. For example, corresponding thermal sensor elements can be arranged on a cleaning roller, and the correspondingly forming contact between cleaning roller and film material can be utilized for carrying out this temperature determination.

Furthermore, it can be advantageous if, in a method according to the invention, the determination of the frost line is performed at least sectionally in an axial direction transverse to the conveyance direction of the film material on a casting roller. A casting roller is typically embodied having a cylindrical shape, which is rotatably mounted about an axis of rotation. The casting roller thus rotates during the entire method for the corresponding transportation and the cooling of the film material arranged on the surface thereof. The determination of the frost line preferably also extends at least over a section of this axial direction transverse to the conveyance direction of the film material. A frost line is preferably determined in points or even continuously over the entire length of the axial alignment of the casting roller. It is therefore possible to recognize additional disadvantages or avoid quality deficiencies. Thus, for example, due to a reduced seal in the vacuum box or uneven melting temperature at the discharge in the axial direction, an asymmetrical arrangement of the frost line can be the consequence. This would result in different ductilities along the axial extension, i.e., the width of the film web. Such asymmetrical effects in the form of a circumferential shift or a circumferential offset of the frost line can be recognized and therefore remedied by way of this embodiment of a method according to the invention.

It is also advantageous if, in a method according to the invention, the determination of the frost line is carried out at determined, in particular fixed determination positions, which are spaced apart from one another in the axial direction and/or in the circumferential direction in relation to a casting roller of the film machine. Fundamentally, the determination positions can also be defined and specified as measurement positions. Thus, for example, a corresponding sensor device or measuring device can be moved using a circumferential adjustment of an adjustment device, to carry out a search for the frost line. However, measuring devices having individual sensor elements at fixed determination positions are also conceivable, to at least permit a restriction of the frost line to an advantageously small region.

It is furthermore advantageous if, in a method according to the invention, the correlation of the determined position of the frost line with at least one target position is performed qualitatively. As already mentioned in the introduction, a qualitative analysis is to be understood in this case with respect to a location before or after the target position, in relation to the contact length. Thus, a fulfillment of the quality feature can be answered positively or negatively in a simple manner. A simple, cost-effective, and above all rapid regulation is therefore also possible.

Of course, however, it is also conceivable that in a method according to the invention, the correlation of the determined position of the frost line with at least one target position is advantageously performed quantitatively. Thus, a numeric value or a numeric parameter is preferably determined for the correlation, which dimensions the distance along the contact length in millimeters, for example. A distance between frost line and target position with respect to the angle position in relation to the axis of rotation of the casting roller is also conceivable in the meaning of the present invention in this case. In particular if a method according to the invention is used for the control loop explained in greater detail hereafter, a quantitative analysis method can be accompanied by substantial advantages. Quality classes can also be introduced, which correlate in a quantitative manner with corresponding correlation values.

A further advantage is achievable if, in a method according to the invention, the correlation of the determined positions of the frost line is performed with at least two target positions, wherein subsequently at least one regulating step is performed, to keep the determined position of the frost line between the two target positions or move it between the two target positions. A particularly narrow tolerance window is thus specified, which is arranged between these two target positions. In particular, an excessively high stretchability is also avoided in this manner, which would possibly result in excessively low retaining forces in use of a winding machine. Inadequate cargo securing could be the consequence in the event of excessively low retaining forces. A movement between the two target positions is thus performed if the frost line is located outside this tolerance window. If the frost line is located within this tolerance window, the regulating step thus has the result of keeping the frost line there. The regulating step includes in this case a change or an intentional maintenance of the corresponding regulation parameter of the film machine. In this case, the regulation can be part of this method or also part of a downstream regulation method, to which the corresponding items of information, in particular the correlation, are provided as an input value.

Furthermore, it is advantageous if, in a method according to the invention, the ascertained correlation and/or the assigned stretchability are stored. This means that monitoring of the entire production is performed in particular in a continuous manner. Greatly varying quality classes can thus already be set during the manufacturing and/or monitored and stored on the basis of the determination. Facilitated documentation of the corresponding quality classes and also the required guarantee values can also occur here. Substantial advantages arise here in particular with respect to possible assurance questions, because this step is carried out automatically in particular.

A further advantage is if, in a method according to the invention, a control and/or a regulation of the film machine is performed on the basis of the assigned stretchability for a targeted change of the position of the frost line. In other words, a control loop is incorporated into the method according to the invention or positioned downstream from the method according to the invention. The assigned stretchability and the correlation thus described with a target stretchability is accordingly a targeted change option for regulating parameters. Thus, corresponding regulating parameters of the film machine, as have already been explained, can be changed to shift the frost line in a targeted manner and therefore to change the stretchability of the produced stretch film. In particular, automatic readjustment and therefore automatic feedback in the event of recognized deviation is used both in a startup process of the film machine and also in running operation. Storage of such items of information about targeted changes can also be used to prepare or optimize a film model, on which the regulation can furthermore be based later in the form of characteristic curves. In this case, the targeted change and also the regulation are conceivable both quantitatively and also qualitatively in the meaning of the present invention. Not least, such data, in particular stored quality data of the stretchability, can be relayed to a winding robot, to supply it with the exactly existing and determined stretchability of the presently used stretch film, so that the correct retaining force is preferably always usable exactly by the winding robot by way of a corresponding variation of the employed elongation depending on the assigned stretchability of the stretch film.

A measuring device for monitoring the stretchability during the production of stretch films in a cast film method is also subject matter of the present invention. Such a measuring device has a sensor device for a determination of position of a frost line of a film material, which solidifies to form a film web, on a casting roller of a film machine. Furthermore, a monitoring unit is provided for an ascertainment of the correlation of the determined position of the frost line with at least one target position and a comparison of the ascertained correlation to a stretchability of the film material assigned to the at least one target position. The monitoring unit and/or the sensor device are preferably designed in this case for the execution of a method according to the invention. The measuring device is therefore accompanied by the same advantages as were explained in detail with reference to a method according to the invention.

A film machine for a production of stretch films in a cast film method is also subject matter of the present invention. This film machine has a discharge device having a discharge gap for the discharge of free-flowing film material and a rotatably mounted casting roller for receiving the discharged free-flowing film material on the surface of the casting roller. Furthermore, the film machine has a measuring device according to the present invention. In particular, a cleaning device having a rotatably mounted cleaning roller for a contact of the film material arranged on the surface of the casting roller is furthermore provided. By way of the use of a measuring device according to the invention, the film machine according to the invention is accompanied by the same advantages as were explained in detail with reference to a method according to the invention. In this case, the measuring device can be at least partially combined with the cleaning device, in particular with a corresponding adjustment mechanism of this cleaning device.

Further advantages, features, and details of the invention result from the following description, in which exemplary embodiments of the invention are described in detail with reference to the drawings. In this case, the features mentioned in the claims and in the description can each be essential to the invention individually or in any arbitrary combination.

Figure 2:
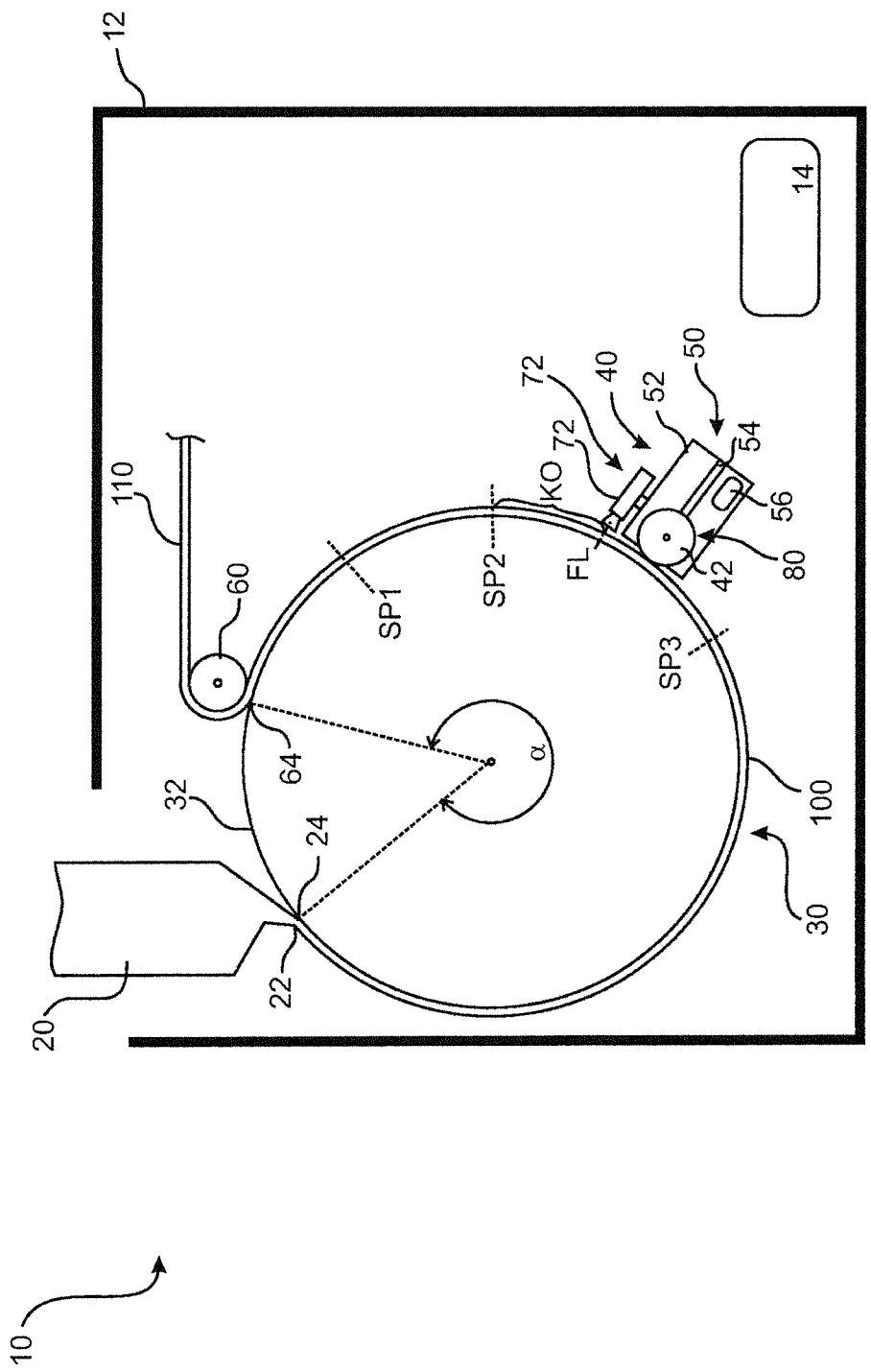

FIGS. 1 and 2 schematically show a film machine 10 having a framework 12. A casting roller 30, which is accommodated in a rotatably mounted manner in this framework 12, is located in this framework 12. Free-flowing film material 100 is situated via a discharge gap 22 on the surface 32 of the casting roller 30 via a discharge device 20, from which one or more extruder devices are mounted upstream, for example. The casting roller 30 is designed as cooled in this case, so that a cooling rate and therefore cooling down of the film material 100 are provided over the contact length. The solidified film web 110 is lifted off of the casting roller 30 via a tear-off roller 60 at the lifting-off location 64, which, together with the receiving location 24, results in a wrap-around angle α.

The embodiment according to FIG. 1 is furthermore equipped with a cleaning device 40, which contacts the film web 110 or the film material 100 with the aid of a cleaning roller 42. This contacting is used to press corresponding contaminants between the surface 32 of the casting roller 30 and the film material 100 into the film material 100 and to convey them away therewith. The cleaning device 40 is provided with an adjustment mechanism 50, which has both a circumferential adjustment 52 and also a radial adjustment 54 for the cleaning roller 42.

Furthermore, a measuring device 70 is provided here, which can recognize a frost line FL of the film material 100 with the aid of a sensor device 72. In addition, three target positions SP1, SP2, and SP3 are shown here with respect to control technology, as will be explained in greater detail hereafter with reference to FIGS. 3 to 5.

A method according to the invention now searches for the frost line FL, by also moving the measuring device 70 in the circumferential direction in relation to the casting roller 30 by way of the circumferential adjustment 52 here. FIG. 2 shows the situation in which the frost line FL has been found. It is now possible to carry out a method step according to the invention via a monitoring unit 14. The correlation KO between the frost line FL and the second target position SP2 is thus prepared. This is either a qualitative distance, i.e., the location in the direction of the contact length before the target position SP2, or, quantitatively, the actual distance in angle degrees or millimeters between the frost line FL and the second target position SP2. This can be used for the corresponding information, about which stretchability the presently produced film web 110 has.

Figure 3:
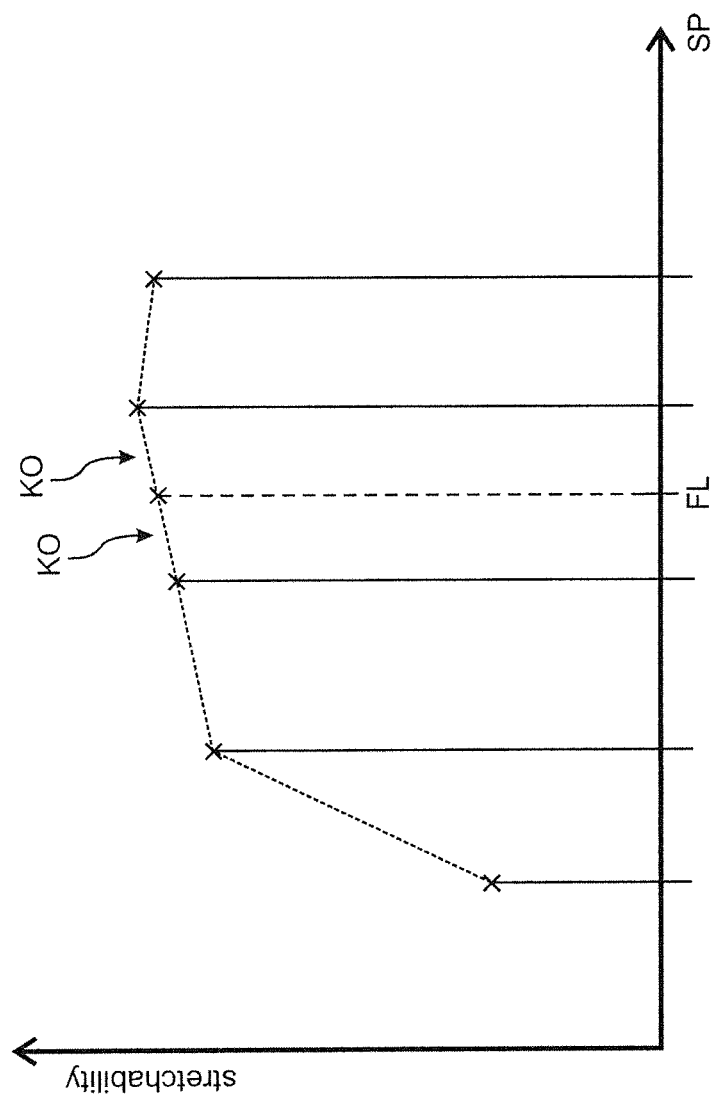

FIG. 3 shows how a method according to the invention can be designed in a quantitative and qualitative manner. If the frost line FL is recognized, it can thus be compared in a corresponding diagram to a total of five target positions SP in this case. The frost line FL is located here between the third and the fourth target positions SP. This is the qualitative statement, which accordingly defines a stretchability between the two ductilities which are assigned to these two target positions SP. It is also possible here, for example, by way of linear interpolation, to connect the individual target positions SP to one another as support points, so that a quantitative statement is also possible by way of the explicit distance to the respective target position for the actual stretchability of the film web 110.

Figure 4:
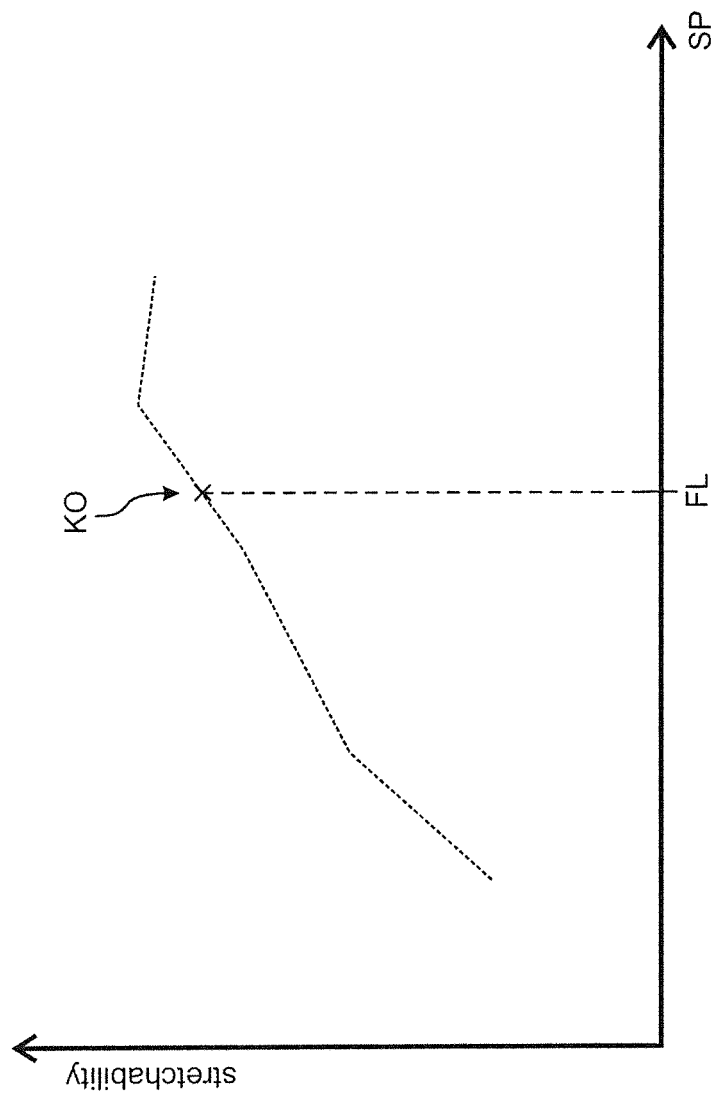

FIG. 4 shows in this case a solution in which the target positions SP are set by way of a functional relationship with the frost line FL. Thus, an arbitrarily high number of target positions SP is shown in this functional relationship in principle, so that the correlation directly provides a corresponding assigned stretchability for recognized positions of the frost line FL.

Figure 5:
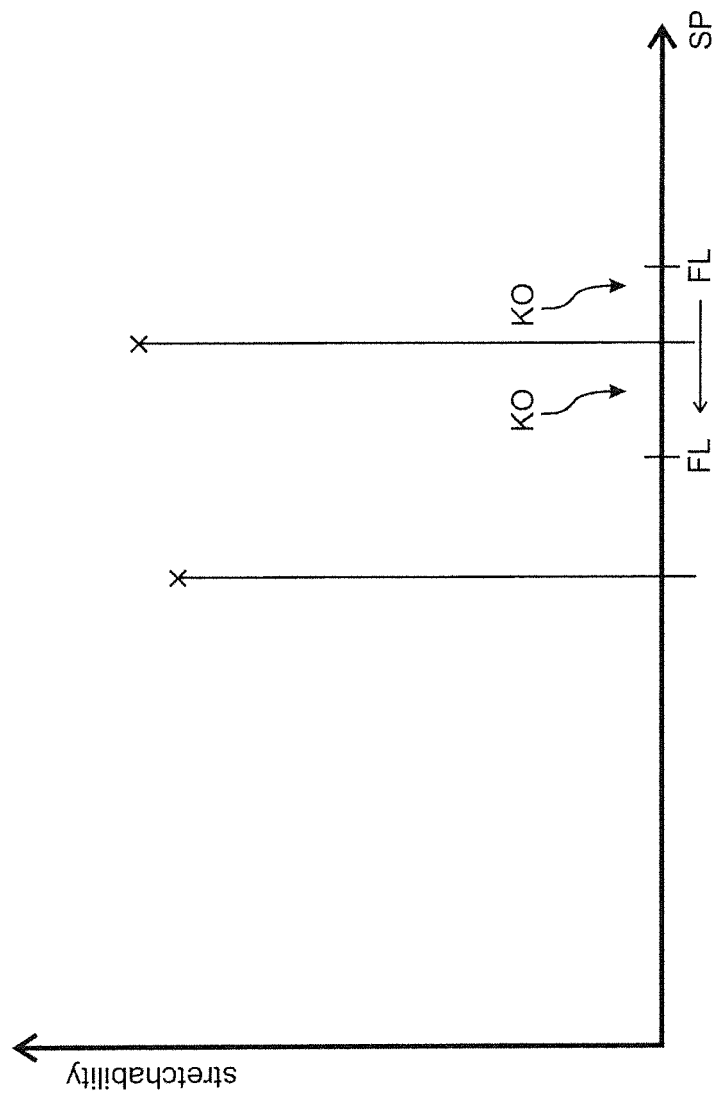

FIG. 5 shows how a targeted change can occur. A frost line FL was thus recognized outside a tolerance field between the two target positions of the patent in dispute of this embodiment. As the arrow shows, a change of one or more regulation parameters of the film machine 10 is subsequently performed to shift the frost line FL back into the tolerance window.

The preceding explanation of the embodiments relates exclusively to the description of examples. Individual features of the embodiments, if technically useful, can be combined with one another without leaving the scope of the present invention.

The invention claimed is:

1. A method of monitoring stretchability of produced stretch films in a cast film method, comprising:
   determining a position of a frost line of a film material, which is solidifying to form a film web, on a casting roller of a film machine using a camera or an ultrasonic device moveable by a circumferential adjustment,
   ascertaining a correlation of the determined position of the frost line with at least one target position,
   comparing the ascertained correlation to at least one stretchability of the film material, which is assigned to the at least one target position, and
   adjusting the position of the frost line relative to the at least one target position to obtain a maximum stretchability of the stretch film in a range between 50% and 500%.

2. The method as claimed in claim 1, wherein the determination of the frost line is at least partially carried out by ultrasound.

3. The method as claimed in claim 1, wherein determination of the frost line is at least partially carried out by a marking roller, and geometrical markings are introduced into the solidifying film material.

4. The method as claimed in claim 1, wherein determination of the frost line is at least partially performed by temperature determination of the film material comprising a comparison to a solidification temperature of the film material.

5. The method as claimed in claim 1, wherein determination of the frost line is at least sectionally performed in an axial direction transverse to a conveyance direction of the film material on a casting roller.

6. The method as claimed in claim 1, wherein determination of the frost line is carried out at fixed determination positions spaced apart from one another in an axial direction and/or in a circumferential direction in relation to a casting roller of the film machine.

7. The method as claimed in claim 1, wherein the correlation of the determined position of the frost line with the at least one target position is performed qualitatively.

8. The method as claimed in claim 1, wherein correlation of the determined position of the frost line with at least one target position is performed quantitatively.

9. The method as claimed in claim 1, wherein correlation of the determined position of the frost line is performed with at least two target positions and, subsequently, at least one regulation step is performed to keep the determined position of the frost line between the two target positions or move it between the two target positions.

10. The method as claimed in claim 1, wherein ascertained correlation and/or the assigned stretchability is stored.

11. The method as claimed in claim 1, further comprising performing a control and/or a regulation of the film material on the basis of the assigned stretchability for a targeted change of the position of the frost line.

12. A method of monitoring stretchability of produced stretch films in a cast film method, comprising:
   casting a stretch film by a film machine equipped with a vacuum box;
   determining a position of a frost line of a film material, which is solidifying to form a film web, on a casting roller of a film machine using a camera or an ultrasonic device moveable by a circumferential adjustment,
   ascertaining a correlation of the determined position of the frost line with at least one target position, and
   comparing the ascertained correlation to at least one stretchability of the film material, which is assigned to the at least one target position.

13. A method of monitoring stretchability of produced stretch films in a cast film method, comprising:
   casting a stretch film by a film machine equipped with a vacuum box,
   determining a position of a frost line of a film material, which is solidifying to form a film web, on a casting roller of a film machine using a camera or an ultrasonic device moveable by a circumferential adjustment,
   ascertaining a correlation of the determined position of the frost line with at least one target position,
   comparing the ascertained correlation to at least one stretchability of the film material, which is assigned to the at least one target position, and adjusting the position of the frost line relative to the at least one target position to obtain a maximum stretchability of the stretch film in a range between 50% and 500%.

\* \* \* \* \*